United States Patent
Ueda et al.

[11] Patent Number: 5,975,403
[45] Date of Patent: Nov. 2, 1999

[54] FEEDER OF WIRE SOLDER

[75] Inventors: Masayoshi Ueda, Nishinomiya; Shinsuke Kurahashi, Itami, both of Japan

[73] Assignee: Matsushita Electric Industrial Co., Ltd., Osaka, Japan

[21] Appl. No.: 09/065,489

[22] Filed: Apr. 24, 1998

[30] Foreign Application Priority Data

Apr. 25, 1997 [JP] Japan ................................. 9-123207

[51] Int. Cl.⁶ .................................................... B23K 3/06
[52] U.S. Cl. ............................. 228/8; 228/41; 219/85.18
[58] Field of Search ............................. 228/8, 41, 247; 226/33; 219/85.18

[56] References Cited

U.S. PATENT DOCUMENTS

| | | | |
|---|---|---|---|
| 3,707,258 | 12/1972 | Schlitt ........................................ | 228/41 |
| 3,797,725 | 3/1974 | Mori et al. ................................. | 228/41 |
| 4,832,246 | 5/1989 | Ono et al. ................................. | 228/41 |

FOREIGN PATENT DOCUMENTS 6907051  9/1970  Netherlands ............................. 228/41

OTHER PUBLICATIONS

"Wire Solder Supplying Mechanism," *Patent Abstracts of Japan*, 07–9127 (Appl. No. 05–154694, Filed Jun. 25, 1993) Publ. Jan. 13, 1995.

Primary Examiner—Patrick Ryan
Assistant Examiner—Jeffrey T. Knapp
Attorney, Agent, or Firm—Wenderoth, Lind & Ponack, L.L.P.

[57] ABSTRACT

A movement detector of the feeder of wire solder directly touches the wire solder, and the movement detector includes (a) a rotating body which revolves when the wire solder moves along a feeding direction and (b) a rotation detector which produces a rotation detecting signal by detecting a rotation of the rotating body. An abnormal halt detector of the feeder of the wire solder compares a rotation detecting signal from a rotation detector with a rotation instructing signal sent to a motor which feeds the wire solder, and calculates the comparison result, thereby judges an abnormal halt of the wire solder. When the abnormal halt is detected, a feeding roller for the wire solder is stopped, whereby the wire solder is prevented from being bent and deformed.

5 Claims, 4 Drawing Sheets

FEEDER OF WIRE SOLDER

FIELD OF THE INVENTION

The present invention relates to a feeder of wire solder used for soldering electronics parts.

BACKGROUND OF THE INVENTION

A light beam heating apparatus which heats up a local spot without touching thereat is widely used for soldering a small size electronic part. Wire solder or cream solder is used in general when the light beam heating apparatus is employed. A conventional feeder of wire solder employed in a soldering machine is described hereinafter by referring to FIG. 3.

In FIG. 3, a solder detector 2 monitors whether wire solder 1 is guided normally to a feeding roller 3 without interruption. Two feeding rollers 3 are driven by a motor 5. A feeding controller 6 controls a rotation of the motor 5. A distance between the feeding rollers 3 is adjusted responsive to a diameter of the wire solder. An abnormal halt detector 4 of the wire solder detects an abnormal halt of the wire solder at a downward place from the abnormal halt detector 4 due to e.g., a clogging in a feeding tube 7. When the abnormal halt detector 4 detects the halt of feeding the wire solder 1, the feeding controller 6 stops the motor 5 and prevents the wire solder 1 from being bent or deformed.

The feeding tube 7 has a dual structure, i.e., it comprises an outer tube and an inner tube. The wire solder 1 goes through the inner tube. The interior of the inner tube employs a material of a small slide resistance. A feeding direction fine adjuster 8 disposed at the tip of the feeding tube 7 can fine adjust a feeding direction of the wire solder 1.

In this feeder, the wire solder 1 has been guided to the feeding roller 3 via the solder detector 2. The two feeding rollers 3 feed the wire solder 1 to an objective spot by passing through the abnormal halt detector 4, the feeding tube 7, and being directed by the feeding direction fine adjuster 8.

The structure of the abnormal halt detector 4 is described by referring to FIG. 4. A guide tube 9 transfers the wire solder 1 into the abnormal halt detector 4 in which a spring 10 is incorporated. A dog 11 triggers a micro-switch 11.

When the wire solder 1 is blocked e.g. by a clog in the feeding tube 7, which is placed downward from the abnormal halt detector 4, feeding force from the feeding rollers 2 generates compression stress to the wire solder 1. When this compression stress excesses the stress which can compress and deform a spring 10, the dog 11 moves along the feeding direction of the wire solder 1 and touches an actuator 12b of a micro-switch 12 to actuate the micro-switch 12. When the micro-switch 12 is actuated, the feeding controller 6 stops the motor 5, and the feeding of the wire solder 1 by the feeding rollers 3 is halted, whereby the wire solder 1 is prevented from being bent and deformed. In other words, the abnormal halt detector 4 functions as a force sensor which senses a compression stress from the compressed and deformed spring 10. The compression stress is generated by the abnormal halt of the wire solder 1 and applied to the wire solder.

However, when the wire solder 1 has a so small diameter that stiffness of the wire is not enough, the compression stress applied to the wire solder 1 sometimes bends and deforms the wire solder 1 before compressing and deforming the spring 10. In other words, when the wire solder 1 having a small diameter and insufficient stiffness is employed, the wire solder 1 is not always prevented from being bent and deformed.

SUMMARY OF THE INVENTION

The present invention addresses the above problem, and aims to prevent the wire solder to be bent and deformed in the feeder of the wire solder whatever the diameter of the wire solder is.

The feeder of the wire solder according to the present invention comprises the following elements:

a feeding mechanism which applies feeding force to the wire solder, a movement detector which detects directly a moving of the wire solder, and an abnormal halt detector which detects an abnormal halt of the wire solder and then stops the feeding mechanism.

The feeding mechanism of the feeder of the wire solder according to the present invention comprises the following elements:

a feeding roller which feeds the wire solder, a motor which drives the feeding roller, and a feeding controller which controls a rotation of the motor.

The movement detector of the wire solder comprises the following elements:

a rotating body which touches the wire solder and revolves when the wire solder moves toward a feeding direction, a rotation sensor which detects revolution of the rotating body and produces a rotation detecting signal.

The rotating body used in the present invention is disposed at a notched portion of a guide tube and touches the wire solder directly to revolve.

Further, the abnormal halt detector of the wire solder compares the rotation detecting signal produced by the rotation sensor with a rotation instructing signal fed to the motor, and calculates the comparison result for judging an abnormal halt of the wire solder.

The feeder of the wire solder having the above construction can detect directly the movement of the wire solder being fed when an abnormality occurs in the solder feeding, and stop the feeding at once before compression stress is stored in the wire solder, whereby the compression stress applied to the wire solder is released. As a result, the wire solder is prevented to be bent and deformed.

DESCRIPTION OF THE PREFERRED EMBODIMENTS

Figure 1:
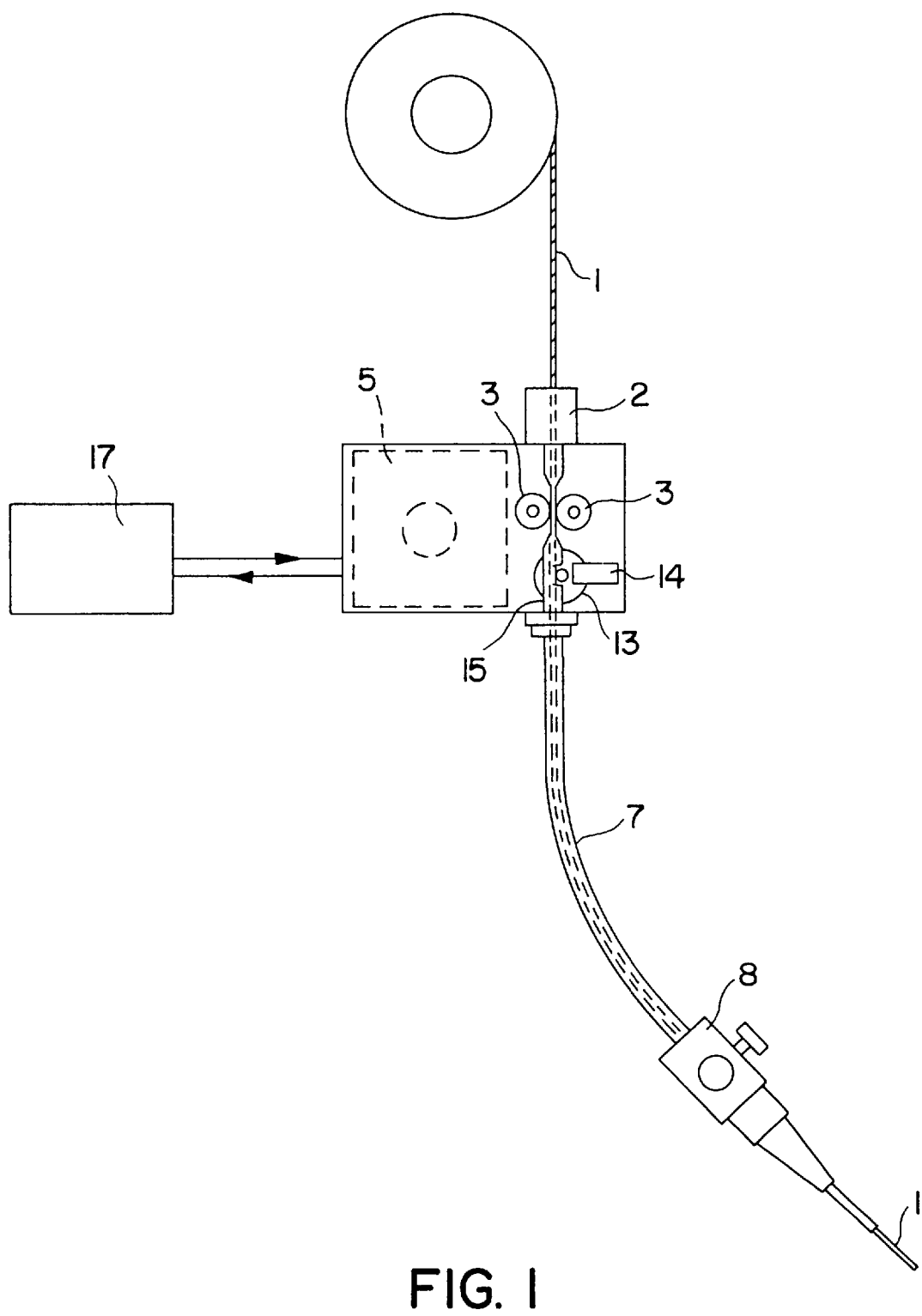
FIG. 1 depicts an entire structure of the feeder of the wire solder according to the present invention.

An embodiment of the present invention is described hereinafter by referring to FIG. 1 and FIG. 2. FIG. 1 depicts an entire structure of a feeder of a wire solder according to the present invention. Except an abnormal halt detector of the wire solder, the feeder of the present invention has the same construction as a conventional feeder, thus the same functions are denoted with the same number as the conventional feeder., i.e. they are wire solder 1, a wire solder detector 2, two feeding rollers 3 which feed the wire solder, a motor 5 which drive the feeding roller 3, a feeding tube 7, a feeding direction fine adjuster 8.

Further, in FIG. 1, a rotating disc 13 which rotates responding to a movement of the wire solder 1, a rotation sensor 14 which detects a rotation of the rotating disc 13, a guide tube 15 of which one portion is notched so that a driven roller 13b incorporated with the rotating disc 13 coaxially can touch the wire solder 1, and a feeding controller 17 which controls a rotation of the motor 5 are illustrated.

The solder detector 2 monitors whether the wire solder 1 is normally fed to the feeding roller 3 without interruption. The motor 5 is controlled its rotation by a feeding control signal tapped off from the feeding controller 17, thereby driving the two feeding rollers 3. A distance between the two feeding rollers 2 is adjusted corresponding to a diameter of the wire solder 1. The feeding tube 7 has a dual structure and comprises an outer tube and an inner tube. The wire solder 1 goes through the inner tube. The interior of the inner tube employs a material of a small sliding resistance. A feeding direction fine adjuster 8 disposed at the tip of the feeding tube 7 can finely adjust a feeding direction of the wire solder 1.

In this feeder of wire solder, the wire solder 1 has been guided to the feeding roller 3 via the solder detector 2. The two feeding rollers 3 feed the wire solder 1 to an objective spot by passing through the abnormal halt detector 4, the feeding tube 7, and being directed by the feeding direction fine adjuster 8.

Figure 2:
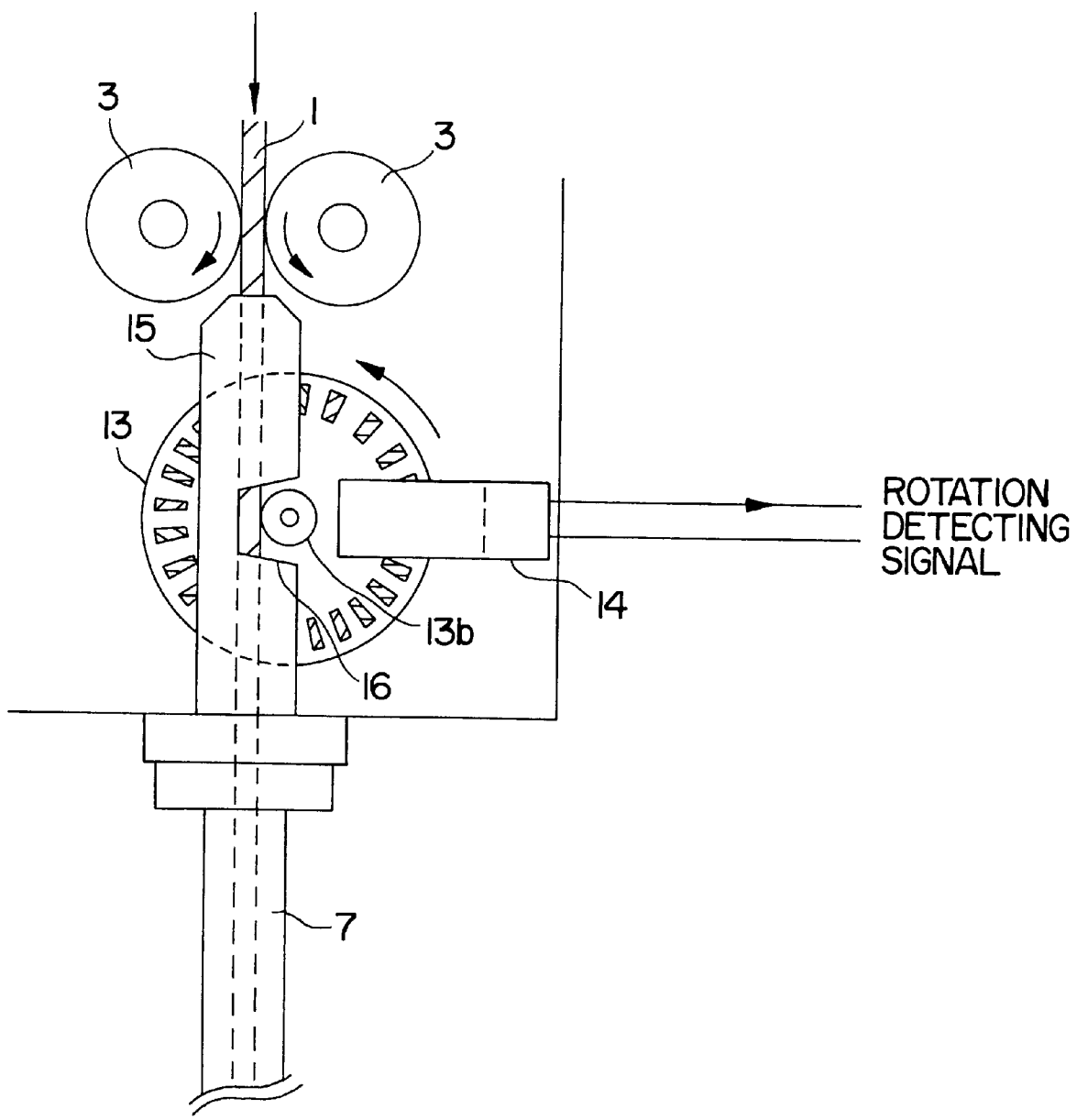
FIG. 2 depicts an essential part of the movement detector of the wire solder according to the present invention.
Figure 3:
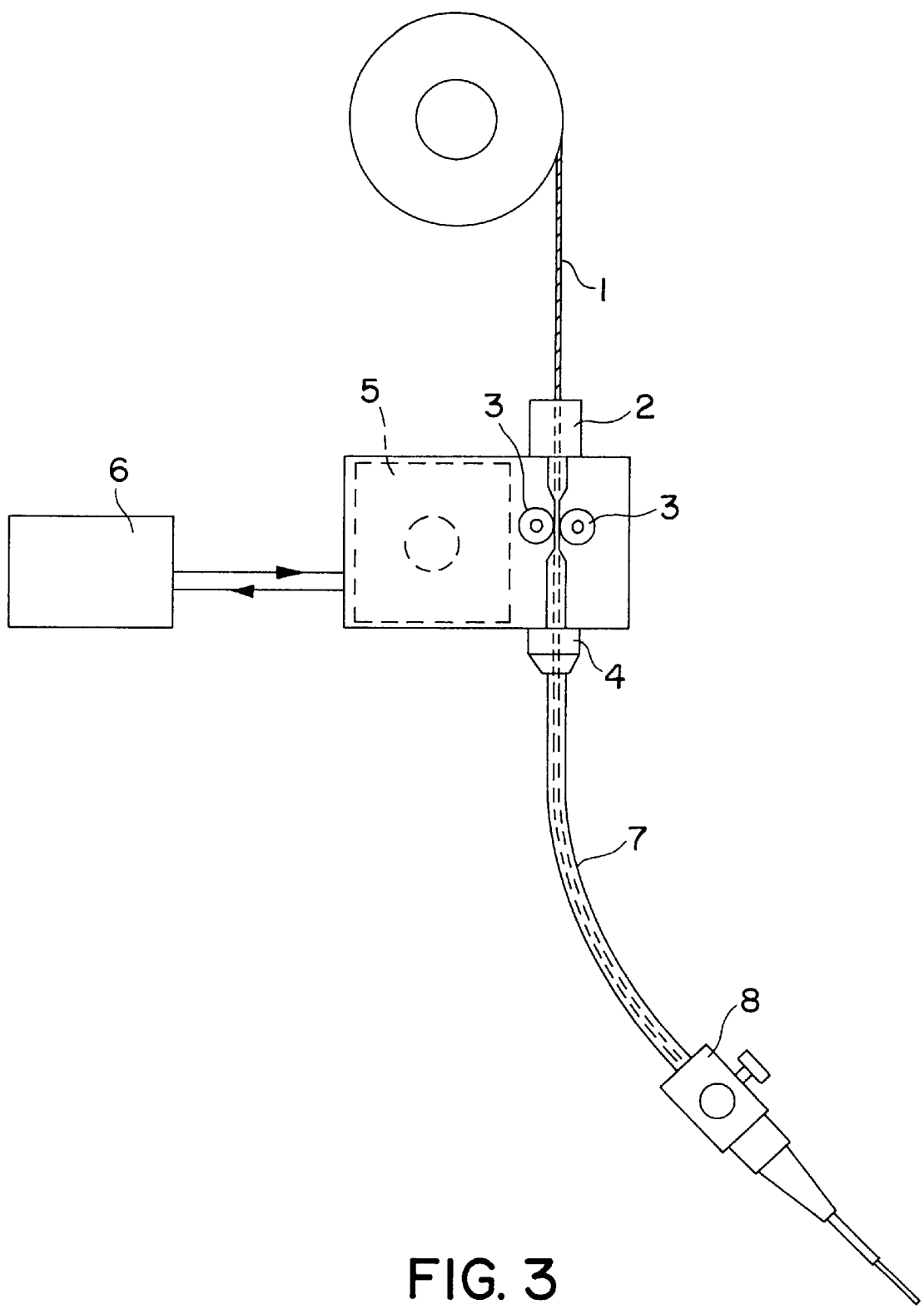
FIG. 3 depicts an entire structure of a conventional feeder of the wire solder.
Figure 4:
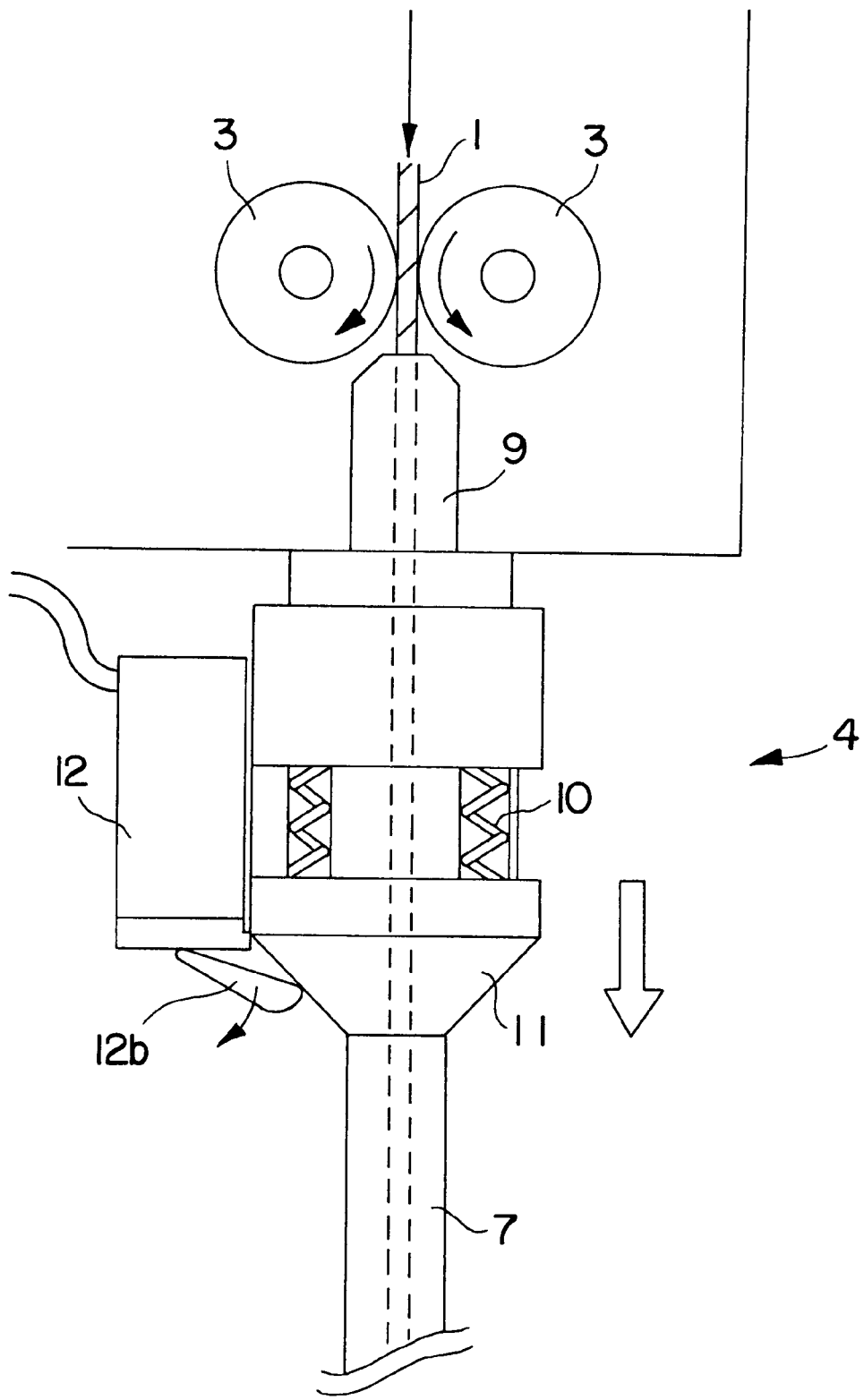
FIG. 4 depicts an essential part of a conventional movement detector of the wire solder.

The movement detector of the wire solder according to the present invention is detailed by referring to FIG. 2. The guide tube 15 has a notch 16 where the wire solder 1 touches the driven roller 13b coaxially incorporated with the rotating disc 13. When the wire solder 1 is fed, the driven roller 13b is rotated by the wire solder 1. Since the rotating disc 13 is incorporated with the driven roller 13b, the rotating disc 13 is also rotated by the fed wire solder. The rotation sensor 14 senses the rotation of the rotating disc 13.

Marks are provided on a concentric circle of the rotating disc 13 at a constant interval, and the rotation sensor 14 detects the mark in an optical manner. When the rotating disk 13 rotates at a constant speed, the rotation sensor 14 produces a detection signal of the marks as a pulse signal with a fixed cycle. In this embodiment, the marks provided on the rotating disc at the constant interval are optically detected, however; the same detection signal can be produced when the marks are provided on a tube face of the driven roller 13b. The marks are not necessarily to be detected optically, but can be detected magnetically. In order to avoid loading a stress to the rotating body, a non-contact type detector employing an optical method or a magnetic method is preferably used for detecting the mark.

The wire solder 1 is fed by the two feeding rollers 3 which are driven by the motor 5. The motor 5 is controlled by a rotation instructing signal produced by the feeding controller 17. When sensing the rotation of the rotating disc 13, the rotation sensor 14 produces a detection signal and sends it to the feeding controller 17. When the wire solder 1 is fed normally, the detection signal is synchronized with the rotation instructing signal produced by the feeding controller 17. The feeding controller 17 compares these two signals and calculates the comparison result, and then verifies the synchronization, thereby judging that the wire solder 1 is normally fed. If the wire solder 1 halts in normal condition, it is judged a normal status.

If the wire solder 1 is halted during its feeding due to some cause such as clogging in the feeding tube 7, the detection signal from the rotation sensor is also halted. Since the rotation instructing signal is tapped off from the feeding controller 17 to the motor 5, the detection signal from the rotation sensor 14 is not synchronized with the rotation instructing signal. Monitoring always the synchronization between these two signals, the feeding controller 17 instantly detects the abnormal halt of the wire solder 1, and stops sending the rotation instructing signal to the motor 5 to halt the motor rotation.

In the conventional abnormal halt detector of the wire solder, the abnormal halt is detected through the following steps:

(a) the wire solder is halted,
(b) compression stress is stored in the wire solder due to the feeding force of the wire solder, and a spring in the abnormal halt detector is compressed and deformed,
(c) a dog moves to turn on a micro-switch, and
(d) the abnormal halt is detected.

The abnormal halt detector according to the present invention detects the abnormal halt through the following steps:

(a') the wire solder is halted,
(b') the rotation detecting signal is stopped to be sent, and thus the rotation instructing signal does not synchronize with the rotation detecting signal,
(c') the abnormal halt of the wire solder is detected.

The abnormal halt detector of the present invention thus senses a movement of the wire solder at first hand and then detects the abnormal halt, while the conventional one detects force by utilizing a mechanical displacement due to compression stress to the wire solder. When the conventional method is used, a time lags because the compression stress is stored in the wire solder until the mechanical displacement is produced. On the other hand, when the abnormal halt detector of the present invention is used, the time lag is not produced, and a detection time is substantially shortened. Thus the motor can be instantly stopped. As a result, even if the wire solder is so thin that an enough stiffness is not secured, the wire solder is still prevented from being bent and deformed thanks to an instant stop of the motor at the abnormal halt.

The above embodiment proves that the feeder of the wire solder of the present invention can monitor the feeding of the wire solder directly, thereby prevent the wire solder from being bent and deformed at the abnormal halt through stopping instantly the feeding of the wire solder.

What is claimed is:

1. A feeder of a wire solder comprising:
   a feeding mechanism for feeding force to the wire solder,
   movement detection means for detecting movement of the wire solder directly to detect the wire solder being fed, and
   abnormal halt detection means for stopping an operation of said feeding mechanism when the wire solder is abnormally halted.

2. The feeder of the wire solder as defined in claim 1, wherein the feeding mechanism comprises:

a feeding roller for feeding the wire solder, a motor for driving said feeding roller, and a feeding controller for controlling a rotation of said motor.

3. The feeder of the wire solder as defined in claim 1, wherein the abnormal halt detection means has a function of judging whether the wire solder is fed normally or not by comparing a detecting signal from the movement detection means with a feeding instructing signal from the feeding mechanism and calculating a comparison result.

4. The feeder of the wire solder as defined in claim 1, wherein the movement detection means comprises:

a rotating body revolving by touching the wire solder when the wire solder moves along a feeding direction, and rotation detection means for detecting revolution of said rotating body and producing a rotation detecting signal.

5. The feeder of the wire solder as defined in claim 4, wherein the rotating body is revolved by touching the wire solder directly at a notched portion of a guide tube.

* * * * *